United States Patent Office 2,768,990
Patented Oct. 30, 1956

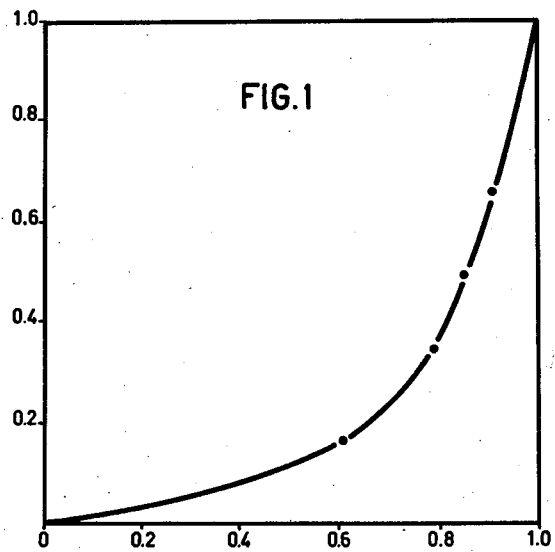
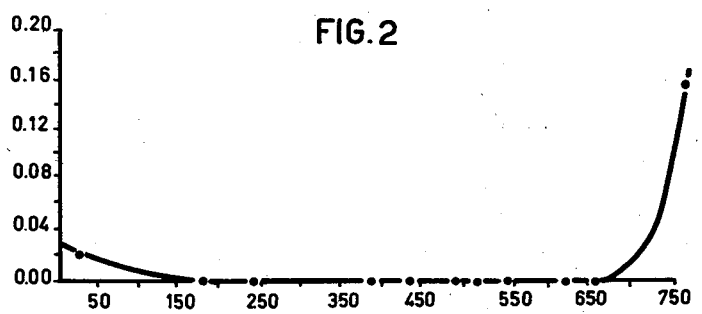

---

2,768,990

SULPHONIUM ANION-EXCHANGER

Geert J. De Jong, Berg and Terblijt, Netherlands, assignor to Stamicarbon N. V., Heerlen, Netherlands Application July 21, 1952, Serial No. 300,115

Claims priority, application Netherlands July 25, 1951

16 Claims. (Cl. 260—2.1)

The present invention relates to new compositions of matter which have been found to have exceptional properties as strongly basic anion exchangers and to have advantages in this connection over compounds used hitherto.

The new compositions of matter consist of or contain macromolecular organic compounds having strongly basic groups.

The invention also relates to these new compounds, to processes to prepare these compounds and to processes in which the new compositions of matter are used.

The new compounds will be described herein in connection with their properties as basic anion exchangers, but it is believed the compounds are new per se and as such may have many other uses.

It is an object of the invention to provide new macromolecular organic compounds containing strongly basic groups, which have exceptional good properties as anion exchangers.

It is also an object of the invention to provide new compositions of matter which contain or consist of these new compounds.

Another object of the invention relates to new processes for the preparation of these new compounds, starting either from a monomolecular compound containing the new strongly basic groups and polymerizing or polycondensing these compounds or from a macromolecular organic compound by introducing the strong basic groups.

A further object of the invention is to provide these new compositions of matter in a special form, suited to the use as ion exchanger or to the use as selective membranes for electrodialysis or electrolysis. Still another object of the invention is to provide an improved process for the exchange of anions in particular for the removal of silicate ions and other anions out of water, using an anion exchange material consisting of or containing the macromolecular compounds according to the invention.

These and other objects of the invention are attained by using as a strongly basic group in any new compositions of matter a tertiary sulphonium group.

The activity of the known organic anion exchangers is invariably based on the presence of ammonium groups, mostly by quaternary ammonium groups in the macromolecular organic molecule.

It has now been found that synthetic resins containing tertiary sulfonium groups act as strongly basic anion exchangers and have improved properties as regards the qualitative and quantitative binding process especially for silicate ions and the ease with which they are regenerated over the macromolecular compounds containing quaternary ammonium groups.

The polysulphonium compounds according to the invention can be prepared according to two general procedures because the starting material may be a polymeric compound into which the sulphonium groups are introduced, or a low molecular sulphonium compound, which is subsequently polymerized or polycondensed with other substances.

I. INTRODUCING SULPHONIUM GROUPS INTO A POLYMERIC COMPOUND

In the first general procedure the polymeric compound must contain atoms or atom groups that can be converted into a sulphonium group. As such special mention should be made of the sulphide group and the sulphoxide group.

The sulphide group can be converted into a tertiary sulphonium group by treating it with an alkylating, aralkylating, or arylating agent.

The sulphoxide group can be converted into a tertiary sulphonium group by treating it with an aryl compound in which a substitutent promoting cationoid substitution is present, such as phenetol.

The sulphide group, may also be converted with the help of chlorine, into a dichloro compound, in which the chlorine atoms are bound to the sulphur. This chlorinated product can then be converted into a sulphonium chloride, for instance with $AlCl_3$ and an aromatic compound.

The macromolecular compounds containing sulphide groups or sulphoxide groups, which may be used as starting materials, may differ widely in their composition and be prepared in very different ways.

The starting material may be, for instance, a macromolecular compound in which reactive atoms or atom groups are present which can be replaced by sulphide groups or sulphoxide groups. In this manner a polymeric compound containing free amino groups may be converted into a sulphide via the respective diazonium compound. Another method of preparation is to start from a low molecular compound, which already contains sulphur atoms, and to convert this, by polymerisation or polycondensation into a macromolecular product. As examples hereof we may mention the conversion of a divinyl sulphide into a polyvinyl sulphide under the influence of cations or cationoids such as sulphuric acid, phosphoric acid or tin tetrachloride, the conversion of an alkadiene or an alkapolyene with a dimercaptan or a polymercaptan, the polymerisation of ethylene sulphide and the conversion of a diaryl sulphide with formaldehyde under the influence of condensation agents such as sulphuric acid.

The artificial resins containing tertiary sulphonium groups may also be prepared by starting from a macromolecular compound in which reactive atoms or atom groups are present which can be directly converted into a tertiary sulphonium group with a sulphur containing low molecular compound, such as a sulphide or a sulphoxide. As such we may mention a reactive halogen atom or other group derived from an alcohol by esterification with an inorganic acid such as a sulphate group, which is capable of reacting with a sulphide with the formation of a sulphonium compound.

II. POLYMERISING OR POLYCONDENSING A TERTIARY SULPHONIUM COMPOUND

According to the alternative general procedure the starting material is a tertiary sulphonium compound, which, by a polymerisation or a polycondensation with other reaction components, is converted into a macromolecular compound.

By way of example, we may mention the conversion of a dialkyl-aryl, an alkyldiaryl or a triaryl sulphonium compound, such as trianisyl sulphonium chloride with formaldehyde in concentrated sulphuric acid.

If the degree of polymerisation of the macromolecular products obtained is not yet high enough they may be subjected to further polymerisation or polycondensation reactions. The linear or chiefly linear polymerisation or polycondensation products can be rendered insoluble by a continued condensation with reaction components producing cross linkages.

In those cases where the components to be reacted together form only, or chiefly, linear macromolecules, substances causing the formation of three-dimensional molecules may, if necessary, be added immediately.

As will be seen from the foregoing the resulting products may differ widely in their composition, without departing from the scope of the invention. The tertiary sulphonium groups present in the macromolecular material may be triaryl, alkyldiaryl, dialkylaryl or trialkyl groups. It is also possible to unite one or more aralkyl groups, such as benzyl groups, to the sulphur of the tertiary sulphonium group.

The tertiary sulphonium groups may occur in the macromolecule in the form of cross linkages as is for instance the case in a product obtained by alkylating the polymerisation product of divinylsulphide, or they may be present in side chains, as is the case, for instance, with the product obtained by the condensation of a dialkyl-aryl-sulphonium compound and formaldehyde. Furthermore the sulphur atom of the tertiary sulphonium group may be part of a ring in a heterocyclic compound.

Moreover, other atoms or atom groups than carbon atoms or groups may occur in the macromolecule such as, for instance, ether groups.

The polysulphonium compounds formed may differ in their properties, depending on their composition and manner of preparation. They invariably have a strongly basic character and are always capable of being completely regenerated even after long use without large amounts of regeneration liquids or long contact periods being required. The capacities are in many cases high and remain so.

The new products have been found especially suitable for removing silicic acid from solutions, for this removal is quantitative even after long use, and the resin when loaded with silicic acid, can be completely freed of this acid with comparatively little lye. Even if the regeneration is incomplete, the leakage of silicic acid will always be negligible till the moment of a breaking through.

Beyond a certain degree of polymerisation the resins are completely insoluble in water, lye or acid.

The mechanical properties are naturally dependent on the degree of polymerisation. By choosing a suitable degree of polymerisation or polycondensation, it is possible to obtain products with very good mechanical properties.

The resins may be prepared in the form of flakes, or other comminuted form, by making the product polymerise or condense in block-shape and afterwards flaking or otherwise breaking up this product. Of special importance for technical purposes is the preparation of the anion exchanger in the form of beads.

For this purpose the polycondensation or polymerisation product is formed into drops by dispersing the reacting substances, for instance while stirring, in an inert liquid vehicle in which the reaction components and the reaction product are insoluble, said liquid vehicle having a specific gravity preferably equal to or a little lower than that of the reacting mixture.

Consequently the present invention includes the preparation of an anion exchanger having strongly basic properties which is characterised by the formation of an artificial resin which contains tertiary sulphonium groups and is insoluble in water, lye or acid, by either introducing sulphonium groups in a macromolecular substance or subjecting a lower molecular tertiary sulphonium compound to a polymerisation or polycondensation reaction.

The resulting products, may, if necessary, be granulated.

It has now been found that shaped products may be obtained by carrying out the preparation of the macromolecular compound in which the tertiary sulphonium groups are to be provided, or the preparation of the macromolecular product from the monomeric tertiary sulphonium compounds, in such a manner that the reaction mixture is brought into the desired shape by moulding, for example, by extrusion or spraying, before it is completely gelled, after which the reaction mixture is left to react further.

Thus plate and films may be shaped by forcing the mixture through a narrow slot onto a heated running belt or rotating drum.

In the same manner differently shaped products can be made by pouring the reaction mixture over the surface of a mould, e. g., a hollow one. The resulting films or sheets will easily come loose, e. g., by soaking in water. It is also possible to provide reinforcement in the films, sheets or plates, e. g., one consisting of threads of artificial resin, by which a greater mechanical strength can be obtained.

The shaped plates, sheets, films or other product possess an extremely low electric resistance and are practically impermeable to cations. As a result hereof films prepared as above described are especially suited for application as selective membranes for electrolysis and electrodialysis.

The invention will be elucidated by some examples. It will be understood that the invention is not restricted to these examples but is of much wider scope as appears from the description given before.

*Example 1*

15 parts by weight of trianisyl sulphonium chloride, prepared by reacting anisol with thionyl chloride in the presence of $AlCl_3$, were dissolved in 15 parts by weight of concentrated sulphuric acid. The mixture was cooled to 0° C. Subsequently a solution of 3 parts by weight of paraformaldehyde in 15 parts by weight of concentrated sulphuric acid, cooled to 0° C., was added while stirring.

The mixture passes into a gel with the evolution of heat. By cooling, the temperature was kept below 80° C.

The resulting yellow resin gel was kept at room temperature for 24 hours, so that a secondary hardening took place. Then the resin was broken up, screened to the required grain size (0.6–0.2 mm.) and washed with 1 N soda lye and water until the product was free of sulphate.

The anion exchanger obtained has a strongly basic character, as appears from the results obtained by anion exchange with common salt (NaCl), as shown in Figure 1 of the accompanying drawing. On the vertical axis in Figure 1 is plotted the amount of OH-ions carried by the resin, expressed in the total number of anions present in the solution and in the resin; the horizontal axis gives the amount of OH-ions in the solution, expressed in the same measure. The curve denotes the position of the points marking the equilibrium between the amounts of OH carried by the resin and in the solution.

From the strongly concave form of the curve it will be seen that the common salt is largely converted to hydroxide.

This anion exchanger is, consequently, exceptionally suitable for absorbing silicate ions from solutions; these prove to be absorbed quantitatively, while even after long use no silicic acid is retained in the solution and the anion exchanger can be completely regenerated.

The capacity amounts to 850 mg. eq./litre for hydrochloric acid, that for silicic acid being still higher.

The mechanical properties of the resin are influenced by the ratio between the amount of formaldehyde used and the amount of sulphonium salt. Ratios of 1 part of paraformaldehyde to 5–10 parts of sulphonium salt have proved very good in practice. Moreover, the hardness can be influenced by the addition of small amounts of a monomer having three or more functional groups that may be active in the condensation reaction with formaldehyde, such as anisol, phenetol or diphenyl ether.

Example 2

15 parts by weight of tri-phenetyl sulphonium chloride, prepared by reacting diphenetyl sulphoxide with phenetol in the presence of $AlCl_3$, were dissolved in 15 parts by weight of concentrated sulphuric acid and cooled to 0° C. Thereafter a solution of 2 parts by weight of para-formaldehyde in 10 parts by weight of concentrated sulphuric acid after cooling down to 0° C., was added with vigorous stirring. By cooling, the temperature was kept below 60° C. The resulting resin was treated as described in Example 1 and has corresponding properties.

Example 3

A solution of 8 parts by weight of trianisyl sulphonium chloride in 8–16 parts by weight of concentrated sulphuric acid was introduced into carbon tetrachloride. The mixture was cooled to —5° C., after which a solution of 1 part by weight of para-formaldehyde in 5 parts by weight of concentrated sulphuric acid was added. Thereafter, the mixture was stirred so rapidly that a coarse emulsion of the required drop size was obtained and the temperature was raised slowly to 60–70° C. Within a few minutes the condensation had proceeded so far that hard round grains had been formed. The carbon tetrachloride was separated and then the resin was kept in an oven at a temperature of 40–50° C. for some hours. Subsequently the resulting product was washed with soda lye and then with water.

The resulting anion exchanger proved to have properties corresponding exactly to those mentioned in Example 1.

To illustrate the power of binding silicic acid which this anion exchanger has, we may mention the results of the following test.

Water containing 20 mg. of $SiO_2$, 6 mg. of $CO_2$ and 3.6 mg. of HCl per litre was led through a bed of 28.26 ml. (height 9 cm.) of the resin prepared according to this example and having a grain size of 0.2–0.5 mm., the flow rate per hour of the water being 20 times as large as the bed volume. The water that had passed through the bed was analysed. The regeneration was carried out with 6000 mg. eq. NaOH/litre of ion exchanger at a temperature of 20° C. and with a contact period of 1 hour. The capacity proved to remain constant.

The results of the tenth run are given in the graph shown in Figure 2 of the accompanying drawings. On the vertical axis is plotted the leakage of silicic acid in mg. $SiO_2$/litre, on the horizontal axis the amount of anions absorbed in the ion exchanger in mg. eq./litre of ion exchanger (this is the capacity).

From the graph it follows that up to a capacity of 750 mg. eq./litre the amount of $SiO_2$ allowed to pass remains below 0.1 mg. $SiO_2$/litre. Up to a capacity of 660 mg. eq./litre, the binding of the $SiO_2$ is even quantitative.

From other tests it has been found that with a regeneration level of 2000–3000 mg. eq./litre the $SiO_2$ content of the water treated can, also after very many runs, be kept below 0.05 mg. $SiO_2$/litre during the greater part of the run and in this case the capacity did not change.

Example 4

10 parts by weight of dianisyl sulphide (obtained by reacting sulphur dichloride with anisol at a temperature of 40–70° C., and distilling in vacuo, in which process the fraction boiling at 196° C. and 1 mm. pressure was used) were heated to 80° C., with 10 parts by weight of dimethyl sulphate and kept at that temperature for 3 hours. The reaction mixture was cooled down to 0° C. Thereafter a solution of 3 parts by weight of paraformaldehyde in 20 parts by weight of concentrated sulphuric acid, cooled to 0° C., was added.

After some time, a yellow transparent resin gel was formed.

Subsequently, the material was treated as described in Example 1. Also this anion exchanger proved to be strongly basic. The capacity amounted to 400–600 mg. eq./litre.

Example 5

15 parts by weight of dianisyl sulphoxide, dissolved in 20 parts by weight of concentrated sulphuric acid were mixed with 2 parts by weight of para-formaldehyde, dissolved in 9 parts by weight of concentrated sulphuric acid. A slow condensation took place. After the resin had been subjected to a secondary hardening at 25° C. for 24 hours, it was broken and screened. The flakes, which had a rather dark colour, together with 15 parts by weight of anisol in 50 parts by weight of concentrated sulphuric acid were stirred at room temperature for 24 hours. The excess of anisol was distilled off with steam and the resulting product washed with lye and water. A strongly basic anion exchanger was obtained which had good mechanical properties. The capacity amounted to 400 mg. eq./litre.

Example 6

A mixture of 10 parts by weight of anisol and 10 parts by weight of dimethyl sulphoxide was, under simultaneous cooling and stirring, dissolved in 40 parts by weight of concentrated sulphuric acid, after which the stirring of the mixture was continued for 24 hours.

To 20 parts by weight of the resulting clear solution of dimethyl-anisyl sulphonium sulphate in sulphuric acid, 1 part by weight of anisol was added, after which the mixture was cooled to 0° C. Subsequently a solution of two parts by weight of para-formaldehyde in 10 parts by weight of concentrated sulphuric acid, cooled to 0° C., was added.

After some time a gel was obtained which after 24 hours was sufficiently hard to be worked up in the manner described in Example 1, into a granulated ion exchanger with strongly basic properties.

The capacity amounted to about 300 mg. eq./litre.

Instead of 1 part by weight of anisol, it is also possible to add 2.5 parts by weight of trianisyl sulphonium chloride, which yields products having still better mechanical properties than the ion exchanger described above.

Example 7

4 parts by weight of dianisyl sulphide, obtained in the manner described in Example 4, were mixed with 6 parts by weight of 80% sulphuric acid while stirring and under strong cooling condensed with 1 part by weight of para-formaldehyde which had been dissolved in 6 parts by weight of concentrated sulphuric acid.

The resulting gel was broken up and together with dimethyl sulphate heated for 24 hours at a temperature of 70° C.

After removal of the excess of dimethyl sulphate and sulphuric acid and treating with soda lye and water, a product was obtained that is suited as an anion exchanger. The properties corresponded to those of the product obtained according to Example 4. The capacity only was slightly lower.

Example 8

Divinyl sulphide was prepared by treating 2.2 dichlorodiethyl sulphide with alcoholic soda lye. The resulting product could be polymerized in various ways, for instance under the influence of cation or cationoids such as sulphuric acid, phosphoric acid or tin tetrachloride. A uniform resin gel was obtained in this way by treating slightly aged divinyl sulphide, with a solution of sulphuric acid in dioxane and cooling, said solution having a concentration of about 5%. After a few days the resin had completely hardened.

After having been broken up and screened, the resulting gel was heated for some hours at 60° C. with dimethyl sulphate. A product was formed that, after washing with soda lye and water, had highly basic anion exchanging properties and possessed a capacity of about 200 mg. eq./litre.

The capacities for strong acids mentioned in the examples were determined with 0.01 N HCl at a flow rate per hour of 20 times the volume of the anion exchanger. For silicic acid ions the capacity was determined with a solution containing 20 mg./litre of $SiO_2$, 6 mg./litre $CO_2$ and 6 mg./litre HCl, so at a total acid content of about 1 mg. eq., per litre. The exchanger was regenerated with an amount of soda lye not larger than 10 times the maximum capacity for concentrated acids. In practice smaller amounts of regenerating liquid were generally sufficient.

*Example 9*

100 parts by weight of crude trianisyl sulphonium chloride are dissolved in 180–250 parts by weight of concentrated sulphuric acid. Then a cold solution of 10 to 12 parts (weight) of solid para-formaldehyde in 40–50 parts by weight of concentrated sulphuric acid are added while stirring rapidly. Through a slot the solution is poured onto a slowly rotating heated drum, the temperature of which is adjusted at 50° C. In doing this, care is taken that the reacting mass cannot attract moisture, as this has an unfavourable effect on the speed of the reaction. A foil is formed by suitable adjustment of the extrusion slot and the said foil after some time can be soaked loose from the drum and after that may be freed of its acid by rinsing.

It is of essential importance that the para-formaldehyde be mixed very thoroughly with the sulphonium salt solution so as to prevent the formation of irregularities in the foil.

The hardness and elasticity of the resulting membrane can be regulated by varying the amount of para-formaldehyde added. Increasing the amount of para-formaldehyde results in the formation of a harder but at the same time more brittle foil.

In the same way foils may be made from a macromolecular compound prepared from triphenetyl sulphonium chloride and para-formaldehyde. The properties correspond exactly with those of the foils from trianisyl-sulphonium-chloride and para-formaldehyde.

The foregoing description contains a limited number of embodiments of the present invention. It will be understood that the present invention is not limited to the specific details disclosed since numerous variations are possible without departing from the scope of the following claims.

I claim:

1. A process for the preparation of a macromolecular strongly-basic anion-exchange resin which comprises condensing with formaldehyde in the presence of sulphuric acid a tertiary sulphonium salt wherein the sulphur atom of said tertiary sulphonium salt is bonded to two alkoxy aryl radicals and a radical selected from the group consisting of alkoxy aryl, aryl, and alkaryl radicals, and the anion of said sulphonium salt is the anion of a mineral acid.

2. The process of claim 1 wherein said alkoxy aryl radicals are alkoxy phenyl radicals.

3. The process of claim 2 wherein said alkoxy phenyl radicals are methoxy phenyl radicals.

4. The process of claim 2 wherein said alkoxy phenyl radicals are ethoxy phenyl radicals.

5. The process of claim 1 wherein said tertiary sulphonium salt is bonded to three alkoxy phenyl radicals.

6. The process of claim 5 wherein said alkoxy phenyl radicals are methoxy phenyl radicals.

7. The process of claim 5 wherein said alkoxy phenyl radicals are ethoxy phenyl radicals.

8. The strongly-basic anion-exchange resin formed by the process of claim 1.

9. The strongly-basic anion-exchange resin formed by the process of claim 2.

10. The strongly-basic anion-exchange resin formed by the process of claim 3.

11. The strongly-basic anion-exchange resin formed by the process of claim 4.

12. The strongly-basic anion-exchange resin formed by the process of claim 5.

13. The strongly-basic anion-exchange resin formed by the process of claim 6.

14. The strongly-basic anion-exchange resin formed by the process of claim 7.

15. A process for exchanging anions in solutions which comprises bringing the solution into contact with a strongly basic anion exchange resin produced by the process of claim 1.

16. A process for removing silicic acid ions from water or solutions, containing said ions, which comprises bringing the solutions in contact with a strongly basic anion exchange resin produced by the process of claim 1.

References Cited in the file of this patent

UNITED STATES PATENTS

| | | |
|---|---|---|
| 2,102,103 | Urbain | Dec. 14, 1937 |
| 2,110,712 | Munz | Mar. 8, 1938 |
| 2,234,548 | Brannon | Mar. 11, 1941 |
| 2,314,972 | Dreyfus | Mar. 30, 1943 |
| 2,347,182 | Coffman | Apr. 25, 1944 |
| 2,475,005 | Brannon | July 5, 1949 |
| 2,531,812 | Hauser | Nov. 28, 1950 |
| 2,594,579 | Novotny | Apr. 29, 1952 |
| 2,631,993 | Morgan | Mar. 17, 1953 |
| 2,663,702 | Kropa | Dec. 22, 1953 |
| 2,713,038 | De Jong | July 12, 1955 |

FOREIGN PATENTS

| | | |
|---|---|---|
| 316,370 | Great Britain | Aug. 1, 1929 |
| 152,172 | Austria | Jan. 10, 1938 |

OTHER REFERENCES

Schmidt: The Chemistry of the Amino Acids and Proteins, pages 297–298, Charles C. Thomas, Baltimore, Md. (Copy in Div. 63.)